Dec. 24, 1929.   C. P. EISENHAUER   1,740,540
WATER SOFTENING APPARATUS
Filed Aug. 26, 1926   4 Sheets-Sheet 4

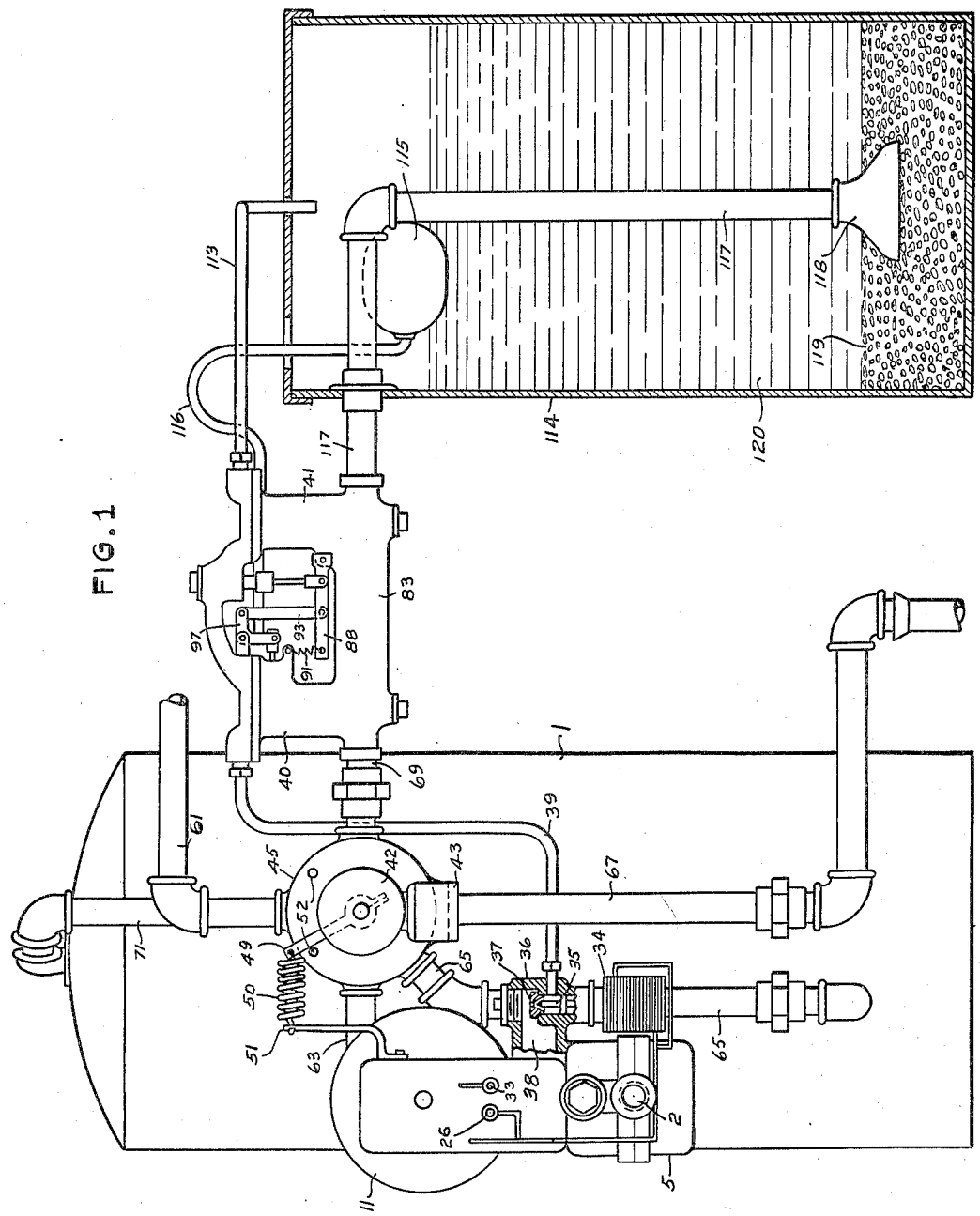

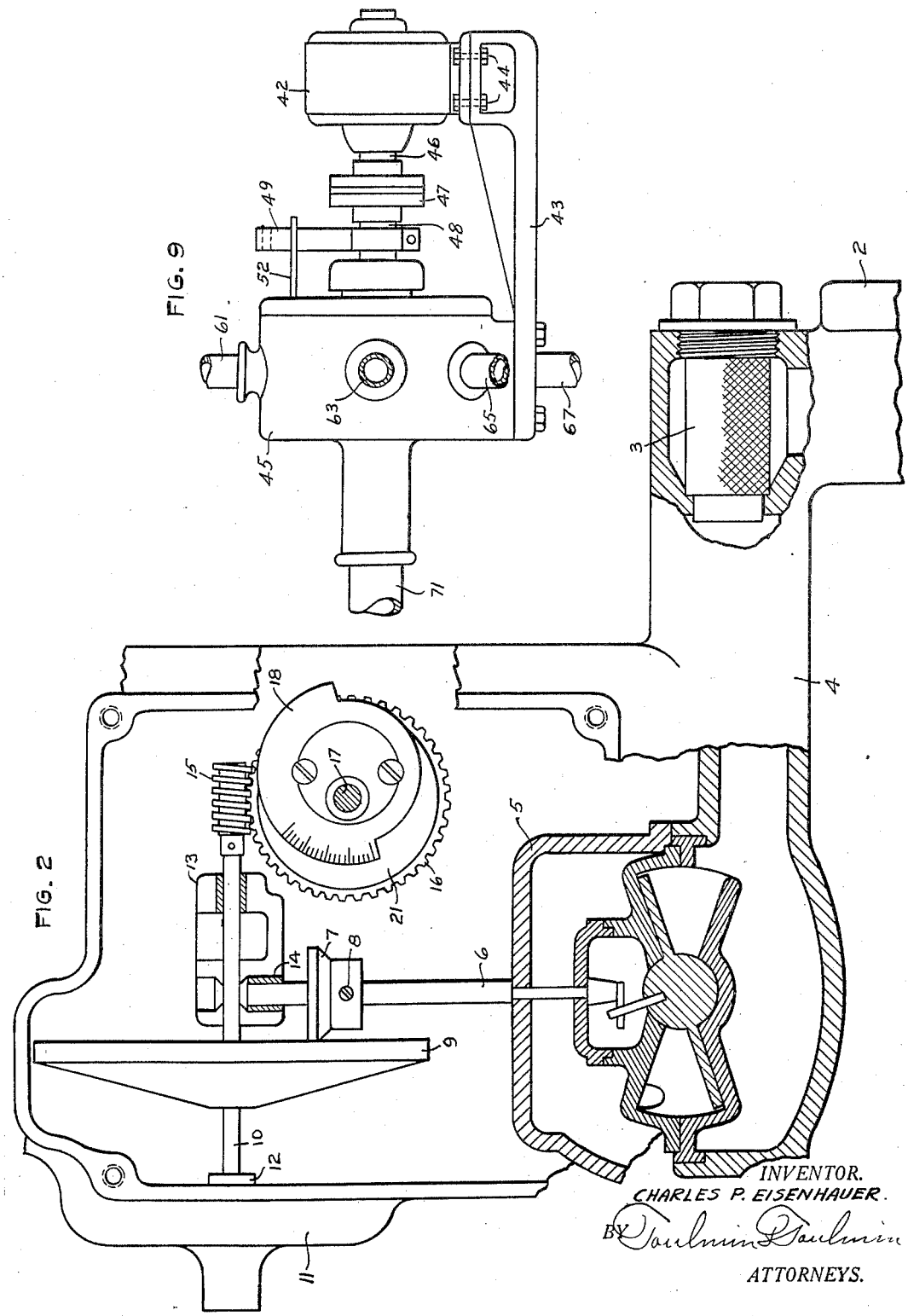

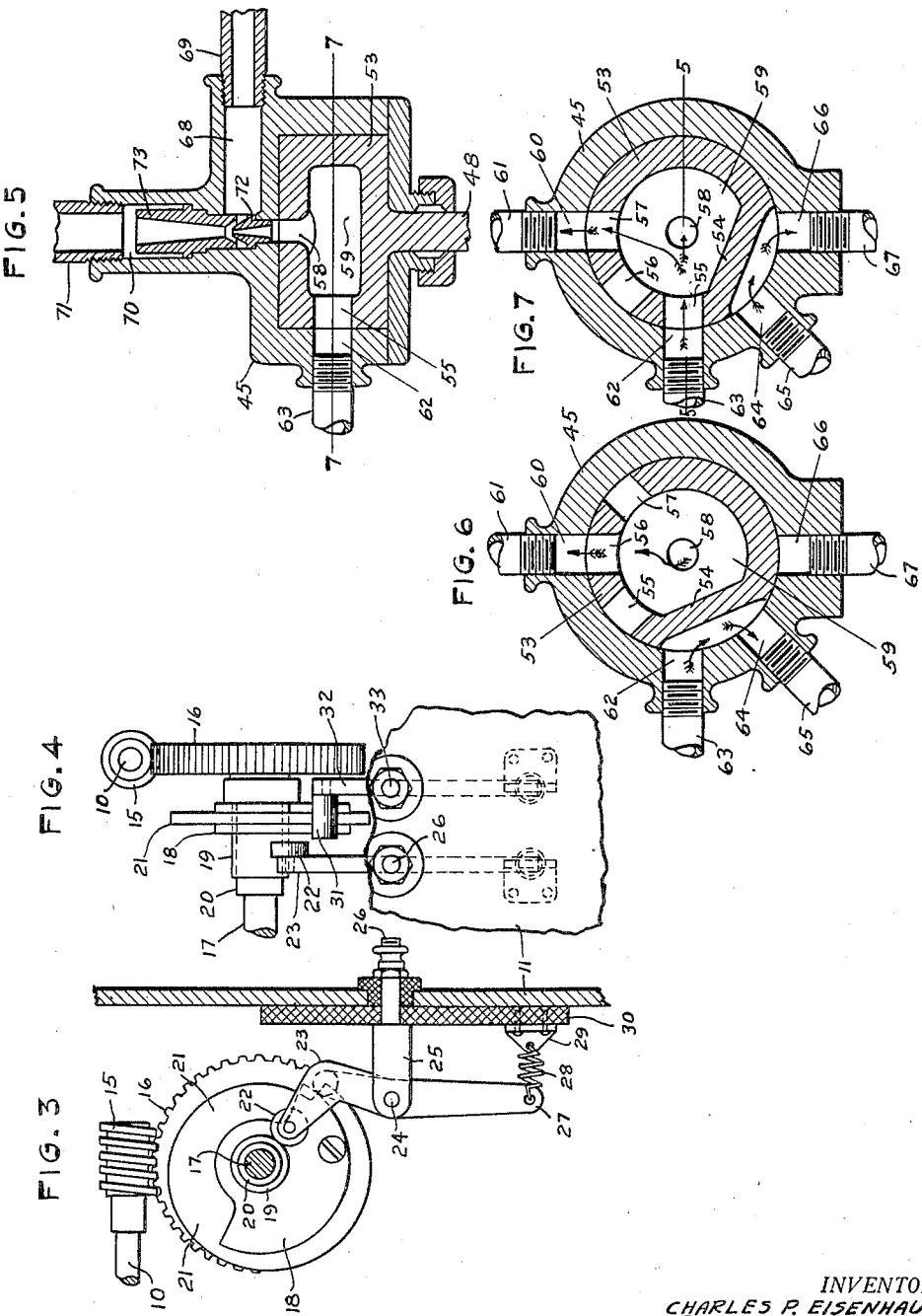

INVENTOR.
CHARLES P. EISENHAUER.
BY Toulmin & Toulmin
ATTORNEYS.

Patented Dec. 24, 1929

1,740,540

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

WATER-SOFTENING APPARATUS

Application filed August 26, 1926. Serial No. 131,783.

My invention relates to automatic water softening apparatus.

It is the object of my invention to provide an automatic water softening apparatus characterized by having a measuring apparatus which is actuated by the quantity of water passing through the water softening equipment, such measuring apparatus being used to control the make and break of a circuit.

It is a further object to provide means in this circuit for electrically operating a hydrostatic needle control valve, which, in turn, operates hydrostatically other valves and controls the movement of a rotary valve which positions the apparatus in either softening or regenerating position.

It is a further object to provide such electrical means for operating the rotary valve which will continuously operate during a certain period but will cease to operate the rotary valve after a predetermined movement despite its own continued operation.

Referring to the drawings:

Figure 1 is a side elevation of the apparatus partially in section to show the arrangement of the needle valve and to show the arrangement of the brine tank;

Figure 2 is a detail view partially in section showing the meter and driving mechanism for driving the make and break cams, which control the operation of the electrical circuit;

Figure 3 is a detail view of the cam and contact mechanism in side elevation;

Figure 4 is a similar view in end elevation;

Figure 5 is a section on the line 5—5 of Figure 7 showing the arrangement of the rotary valve;

Figure 6 is a section on the line 7—7 of Figure 5;

Figure 7 is a similar view of Figure 6 showing the rotary valve in regenerating position;

Figure 9 is a side elevation of the rotor valve casing, piping and motor drive therefor.

Figure 8:
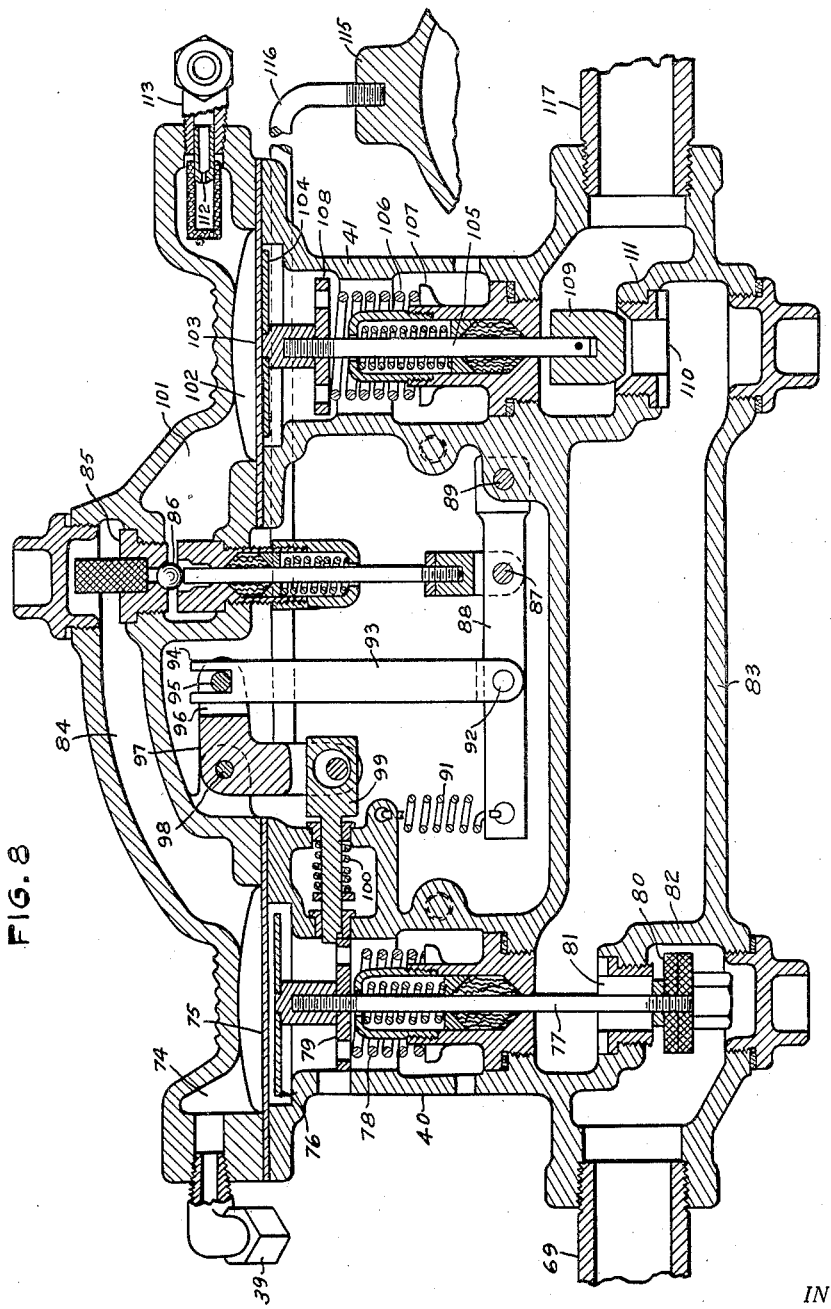
Figure 8 is a section through the refill and brine valves.

Referring to the drawings in detail, 1 is a tank containing softening material arranged in the usual manner, through which the hard water is adapted to flow in one direction and regenerating material, such as brine, is adapted to flow in the other direction, or the water to be softened and the brine may flow in the same direction.

In the present application, for the purpose of illustration, I have selected a conventional form of water softening apparatus, in which the softening is by upward flow and the regenerating with brine is by downward flow.

The hard water enters the system through the pipe 2, flowing through the screen 3 into the pipe 4. It passes through the meter 5, which may be of any desired commercial type, thereby actuating the meter shaft 6. This shaft drives a friction driving member 7 adjustably mounted on the shaft 6 by the set screw 8. The friction driving member 7 in turn actuates the friction disk 9 which is supported on a shaft 10. This shaft is journaled in the housing 11 at one end of the shaft at 12 and the other end of the shaft in the bracket 13 which is a part of the housing.

This bracket 13 also serves as the upper bearing for the shaft 6 at 14. The free end of the shaft is provided with a worm 15 which engages with a worm wheel 16 mounted on the shaft 17 journaled in the housing 11.

This shaft 17 carries a metallic contact cam 18 which carries a sleeve 19 which forms a metallic contact sleeve insulated from the shaft 17 by the insulating sleeve 20. Associated with this contact cam is an insulation cam of insulating material designated 21.

The contact sleeve 19 has engaging constantly therewith a contact roller 22 carried on an arm 23 which is pivotally mounted at 24 on a bracket 25 which is connected electrically by the terminal 26 into a suitable electric circuit. The free end of the arm 27 is connected to a spring 28 which in turn is fixed to a bracket 29 carried on the casing 11 and insulated therefrom by an insulating plate 30. The function of this spring is to maintain the roller 22 in constant engagement with the contact sleeve 19.

A second contact roller 31 carried on a supporting arm 32 is connected to a terminal 33 also in the circuit and likewise provided with a spring 28 to maintain the roller in contact with either the metallic contact cam 18 or the insulation cam 21. The insulation cam serves to break the contact of the contact roller 31 with the contact cam 18.

In this circuit there is connected the solenoid 34 which actuates in the usual manner a needle valve member 35 within the needle valve housing 36. When the solenoid is actuated it unseats the valve 35 from its valve seat 37.

The hydrostatic pressure is admitted from the main water line through the passageway 38, valve seat 37 to the pipe line 39 which leads to the hydrostatically operated refill and brine valves respectively, generally designated 40 and 41, the details of which will be hereinafter described.

In this circuit is also connected an electric motor 42 mounted on a bracket 43 adjustably by the adjusting screws 44. This bracket is a part of the rotary valve casing 45. The armature shaft 46 of the motor carries a clutch 47 adapted to slip when a predetermined resistance is applied, allowing the armature shaft 46 to move independently of the valve shaft 48. This valve shaft carries a lever 49 to the upper free end of which is connected a spring 50. The other end of the spring is connected to a bracket 51 which is stationary.

Stops 52 are provided on the valve casing 45 for limiting the movement of the lever 49 in either direction.

The rotor shaft 48 of the valve mounted within the casing 45 carries a tubular valve member designated 53. This tubular valve member is provided with a flattened side portion 54 and ports 55, 56 and 57 on its periphery and the port 58 at one end thereof, all of which ports communicate with a chamber 59 on the interior of this rotary valve member 53.

The valve casing 45 is provided with a port 60 connected to a pipe 61 which leads to the service or outlet line for the softened water. The casing 45 is provided with an inlet port 62 which is connected to the inlet pipe 63. The casing 45 is also connected to the port 64 which is attached to the pipe 65 leading to the bottom of the softening tank 1. The port 66 in the casing 45 is a brine port connected to the drain pipe 67.

In this casing 45 is a port or passageway 68 connected to a brine pipe 69. This passageway 68 communicates with a second passageway at right angles to it, designated 70, which communicates with the port 58 of the valve member 53 at one end and with the pipe 71 leading to the top portion of the tank at its other end. Mounted in this pipe 70 are a pair of spaced injector members 72 and 73 serving to draw the brine from the brine line 69 into the pipe 70 when water is passing through the pipe 71 to the top of the tank.

Referring to the mechanism for controlling the application of brine and the refilling of the brine tank, and particularly referring to Figure 8, as well as Figure 1, it will be observed that the pipe 39 conveys hydrostatic pressure to a diaphragm valve chamber 74. The base of this chamber has a flexible diaphragm 75 which actuates a plate 76 carried on a valve stem 77. This valve stem is maintained in its uppermost position normally by a spring 78 working on a locking plate 79. The lower end of the valve stem carries a valve member 80 closing a port 81 in a partition 82 in the pipe 83. The diaphragm chamber 74 communicates by a passageway 84 to a needle valve seat 85 controlled by a needle valve 86. This needle valve is pivoted at 87 to a lever 88 mounted at 89 on the frame or housing of the valve 41. The free end of the lever is supported by a spring 91 hinged to the housing of the refill valve 40.

The mid point of the lever 88 is pivotally connected at 92 to a thrust arm 93 having jaws 94 in its upper end engaging with a pin 95 in the jaws 96 of a bell crank 97 pivoted at 98 on the refill valve housing. The lower end of this bell crank is connected with a locking plunger 99 which is yieldingly impelled in one direction by the spring 100. Its free end is adapted to lock the locking plate 79 to lock the refill valve open. The hydrostatic pressure admitted through the valve seat 85 by the movement of the needle valve 86 passes into the passageway 101 into the diaphragm chamber 102 depressing the brine valve diaphragm 103 and consequently depressing the plate 104 on the brine valve stem 105. A spring 106 engaging a shoulder 107 and a plate 108 resists the downward movement, due to the hydrostatic pressure. On the end of the valve stem is carried a valve member 109 adapted to seat on the seat 110 in the partition 111 in the pipe 83.

The chamber 102 is adapted to drain through the small opening 112 through the drain pipe 113 to the brine tank 114.

In this brine tank rides a float 115 carried by a float arm 116 which is connected to the bell crank 97 and moves therewith. The pipe 83 is connected to a pipe 117 which leads into the brine tank 114 and terminates in a bell 118 beneath the surface of a gravel bottom 119 in the brine tank 114, above which gravel is the brine, designated 120.

Method of operation

The hard water enters under pressure through the pipe 3, through the meter 5 into the pipe 63. This results in operating the meter, in rotating the shaft 6, driving member 7, friction disk 9, the shaft 10, the worm 15, and the worm wheel 16, together with the cams 18 and 21 and the sleeve 19.

As the cams rotate, the contact is made and broken through the contact rollers 22 and 31. This controls the make and break of the circuit in which is included the solenoid 34 and the motor 42.

When the circuit is made, the solenoid is actuated and the needle valve opens the port 37 allowing water to pass from the line 4 into the passageway 38 into the pipe 39. The water flows from the pipe 63 through the port 62 when the parts are in softening position, as in Figure 6, through the passageway to one side of the flattened portion 54 of the rotor 53 out the port 64, through the pipe 65 to the bottom of the softener, up through the softening material into the back of the casing 45 through the port 58 into the chamber 59 out the port 56, port 60 and pipe 61 to service.

When the valve is moved to regenerating position, the water will come in through the pipe 63, port 62, port 55, chamber 59, through the port 58, pipe 71, through the softener downwardly to the bottom thereof into the pipe 65, through the port 64, through the passageway to one side of the flattened portion 54 of the rotor 53, through the port 66 out the pipe 67 to drain.

When the parts are in position, shown in Figure 6, which is after the rotor has been moved to softening position, a portion of the water will flow through the passageway 68 into the brine line 69 for replenishing the brine tank and refilling it, as hereinafter described.

The pipe 39 conveys hydrostatic pressure and causes the refill valve 80 to be opened. The brine valve 109 is normally open and hydrostatic pressure is prevented from reaching it by the needle valve 86. This leaves the pipe 83 open for the passage of brine from the brine tank 114 from which it is drawn by injection through the pipe 83 to the pipe 69, as will be hereinafter explained in connection with the rotary valve.

The injection takes place through the passage of water from the supply pipe 63 through the valve member 53 and pipe 71, causing the injector members 72 and 73 to draw brine through the passageway 68 and pipe 69 into the top of the softening tank 1.

When the refill valve 80 is opened by hydrostatic pressure, the plunger 99 impelled by the spring 100 locks it open. As the brine is injected, the float 115 and float arm 116 descend until the requisite amount of brine has been injected. At this point, the descent of the float and float arm will have reached a place where the bell crank 97 will operate the pin 95, moving it downwardly. This moves the lever 93, lever 88 and needle valve 86 downwardly admitting hydrostatic pressure through the passageway 101 to the diaphragm chamber 102 closing the brine valve 109 preventing a further supply of brine. This condition continues until the hydrostatic pressure is relieved in the line 39 by the conversion of the system to softening position, at which time water will flow through the pipe 69 past the valve 80 which is still locked open in the pipe 83 and beneath the valve 109 which is now reopened by the spring 106 due to the fact that there is no hydrostatic pressure in the line 39 and consequently none in the chamber 102. The water continues to flow into the brine tank to refill it until the float 115 and float arm are elevated to a predetermined point, at which point the bell crank 97 will be operated and the locking plunger 99 withdrawn allowing the refill valve 80 to close under the influence of the spring 78. This will allow the spring 91 to operate and close the needle valve 86.

The making of the circuit also starts up the motor 42 causing it to rotate the rotary valve 53 setting up for regenerating position. The turning of the armature shaft 46 moves with it through the clutch 47 the rotary valve member shaft 48 and arm 49 against the resistance of the spring 50. When the arm 49 engages with a righthand stop 52, the valve shaft 48 comes to rest but is held in the position where the lever 49 engages the right hand stop 52 by the continued turning of the motor. The motor maintains the valve in that position due to the slipping of the clutch 47.

As soon as the circuit is broken, when softening starts again, the motor stops and the spring 50 is strong enough to return the arm 49 and shaft 48 with the rotor of the valve to the initial position or softening position.

By this arrangement, I am enabled to secure a continuously rotating power unit and can employ an ordinary commercial motor revolving at 1750 revolutions so that I can quickly move the valve, but, having moved it, can let the motor continue to operate as the clutch 47 will slip sufficiently to merely maintain the valve in its proper position for regeneration against the resistance of the spring 50 without further movement of the valve.

The clutch can be adjusted by any suitable means. The motor itself is adjustable by the set screws 44 on the platform 43.

It will be understood that I desire to comprehend within my invention such modifications as may be necessary to adapt it to varying conditions and uses.

Having thus fully described my invention, what I claim as new and desire to secure by Letters Patent, is:—

1. In a water softening apparatus, means actuated by the incoming hard water, an electrical circuit, contact mechanism for making and breaking the circuit actuated by said means, a rotor valve for positioning the softener in softening position and regenerating position, a motor in said circuit to operate said rotor valve, and yielding means to reverse the position of the rotor valve upon the cessation of the operation of the motor.

2. In a water softening apparatus, means actuated by the incoming hard water, an electrical circuit, contact mechanism for making and breaking the circuit actuated by said means, a rotor valve for positioning the softener in softening position and regenerating position, a motor in said circuit to operate said rotor valve, and yielding means to reverse the position of the rotor valve upon the cessation of the operation of the motor, and means between the rotor valve and the motor for permitting the motor to continue to operate and the rotor valve to come to rest upon a predetermined movement of the rotor valve.

3. In a water softening apparatus, a measuring device actuated by water passing through the water softening system, an electrical circuit, an electric motor in said circuit, an electrically operated needle valve in said circuit, a rotor valve converting the softener from softening position to regenerating position and back to softening position, said rotor being operated by said electric motor, means to make and break said circuit to control the actuation of said needle valve and rotor, said make and break means being controlled by said measuring device, hydrostatic valves for controlling the application of regenerating material to the softener and the refilling of the container for the regenerating material, a container for regenerating material, a container for softening material, said hydrostatic valves being controlled by the hydrostatic pressure admitted to said needle valve.

4. In a water softening apparatus, a tank for softening material, a tank for brine, a rotor valve for directing water to be softened through the softening tank to service in one position and for directing brine from the brine tank through the softener for regenerating the softening material in another position and draining the brine therefrom, a motor for operating said rotor valve, a brine valve to control the application of brine, a refill valve for controlling the refilling of the brine tank, hydrostatic means for operating said valves, a needle valve for controlling the application of hydrostatic pressure thereto, a solenoid for operating said needle valve, an electric circuit including said motor and solenoid, a meter actuated by the incoming hard water to the water softening tank, make and break mechanism in said circuit controlled by said meter, and float mechanism for controlling said refill valve and brine valve in conjunction with the hydrostatic pressure.

5. In a water softening apparatus, a tank for softening material, a tank for brine, a rotor valve for directing water to be softened through the softening tank to service in one position and for directing brine from the brine tank through the softener for regenerating the softening material in another position and draining the brine therefrom, a motor for operating said rotor valve, a brine valve to control the application of brine, a refill valve for controlling the refilling of the brine tank, hydrostatic means for operating said valves, a needle valve for controlling the application of hydrostatic pressure thereto, a solenoid for operating said needle valve, an electric circuit including said motor and solenoid, a meter actuated by the incoming hard water to the water softening tank, make and break mechanism in said circuit controlled by said meter, and float mechanism for controlling said refill valve and brine valve in conjunction with the hydrostatic pressure, a clutch between said rotor valve and motor to permit the motor to turn independently of the rotor valve upon a predetermined resistance to the movement of the rotor valve, means to limit the movement of the rotor valve, and yielding means to restore said rotor valve to its initial position.

6. In a water softening apparatus, a tank for softening material, a tank for brine, a rotor valve for directing water to be softened through the softening tank to service in one position and for directing brine from the brine tank through the softener for regenerating the softening material in another position and draining the brine therefrom, a motor for operating said rotor valve, a brine valve to control the application of brine, a refill valve for controlling the refilling of the brine tank, hydrostatic means for operating said valves, a needle valve for controlling the application of hydrostatic pressure thereto, a solenoid for operating said needle valve, an electric circuit including said motor and solenoid, a meter actuated by the incoming hard water to the water softening tank, make and break mechanism in said circuit controlled by said meter, and float mechanism for controlling said refill valve and brine valve in conjunction with the hydrostatic pressure, a clutch between said rotor valve and motor to permit the motor to turn independently of the rotor valve upon a predetermined resistance to the movement of the rotor valve, means to limit the movement of the rotor valve, and yielding means to restore said rotor valve to its initial position, and means to adjust the make and break mechanism to vary the interval and time of operation of said solenoid and said motor.

7. In a water softening apparatus, a tank for softening material, a rotor valve for directing the water passing through said tank to soften it when the valve is in one position and for directing the brine to the tank to regenerate the softening material in the tank when the valve is in another position, draining the brine from the tank after it has replenished the material, a motor for driving said rotor valve, means to control the operation of the motor depending upon the quantity of water which has passed through the tank, means on said rotor valve to limit its movement in either direction, yielding means to return said rotor when not operated by the motor to its initial position, and means between the rotor valve and the motor to permit the motor to turn relative to the rotor without operating it after the rotor valve has been moved by the motor a predetermined distance.

8. In a water softening apparatus, means actuated by the incoming hard water, an electrical circuit, contact mechanism for making and breaking the circuit actuated by said means, a rotor valve for positioning the softener in softening position and regenerating position, a motor in said circuit to operate said rotor valve, said motor being directly connected to the shaft of said rotor valve, and yielding means to reverse the position of the rotor valve upon cessation of the operation of the motor.

In testimony whereof, I affix my signature.

CHARLES P. EISENHAUER.